UNITED STATES PATENT OFFICE.

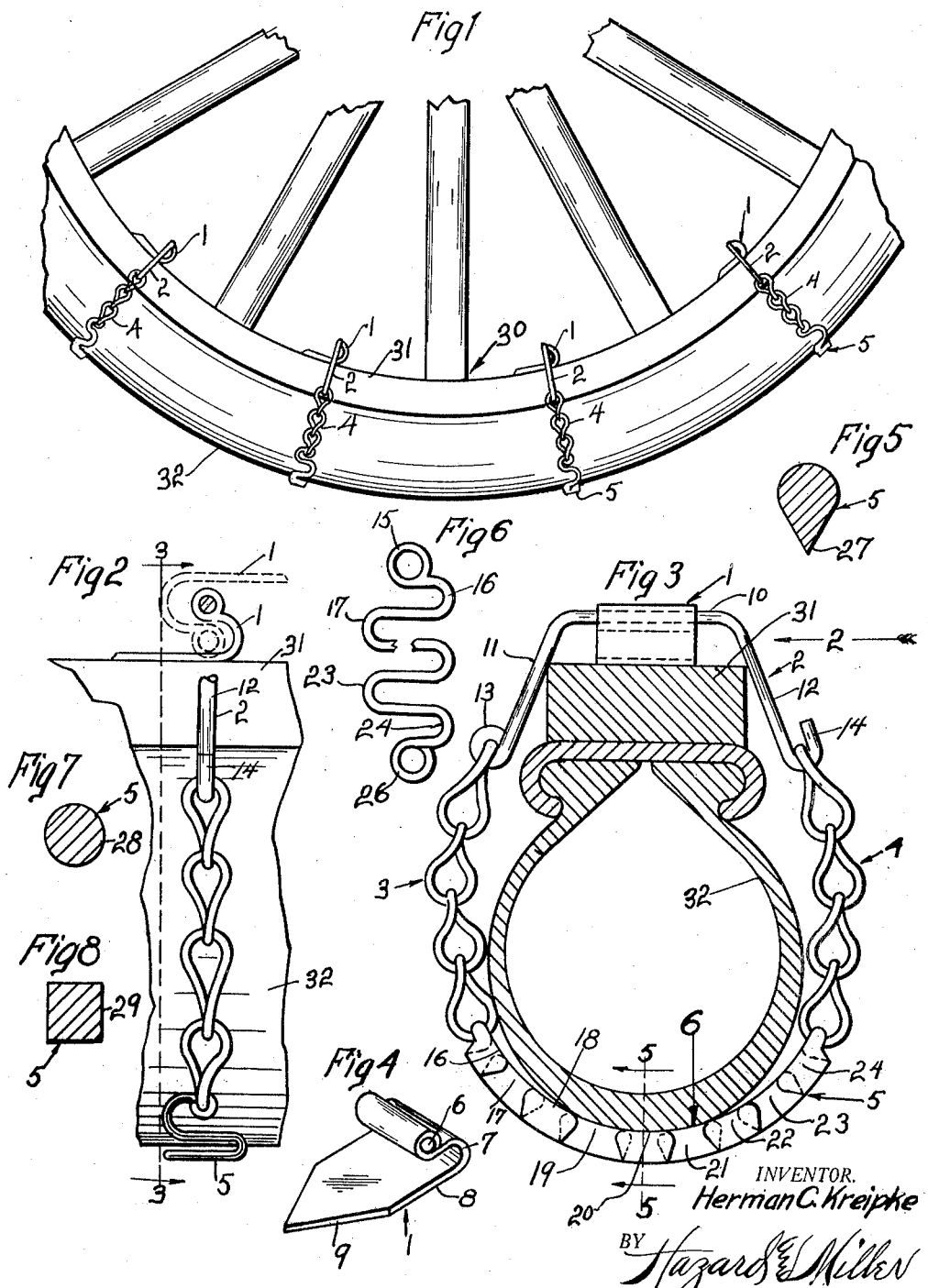

HERMAN C. KREIPKE, OF LOS ANGELES, CALIFORNIA.

ANTISKIDDING DEVICE.

1,330,480. Specification of Letters Patent. Patented Feb. 10, 1920.

Application filed June 17, 1919. Serial No. 304,936.

*To all whom it may concern:*

Be it known that I, HERMAN C. KREIPKE, a citizen of the United States, residing at Los Angeles, in the county of Los Angeles and State of California, have invented new and useful Improvements in Antiskidding Devices, of which the following is a specification.

My object is to make an improved anti-skidding device, and my invention consists of the novel features herein shown, described and claimed.

Figure 1 is a fragmentary side elevation of a wheel showing a plurality of my anti-skidding devices in use.

Fig. 2 is a fragmentary view analogous to Fig. 1 upon an enlarged scale and showing one anti-skidding device, the view being taken looking in the direction indicated by the arrow 2 in Fig. 3.

Fig. 3 is a cross section on the line 3—3 of Fig. 2 and looking in the direction indicated by the arrows.

Fig. 4 is a perspective view of the locking dog shown in Figs. 2 and 3.

Fig. 5 is a cross sectional detail of the ground gripping member as on the line 5—5 of Fig. 3.

Fig. 6 is a fragmentary plan upon a reduced scale of the ground gripping member as seen looking in the direction indicated by the arrow 6 in Fig. 3.

Fig. 7 is a view analogous to Fig. 5 and showing a modified construction.
Fig. 8 is a view analogous to Figs. 5 and 7 and showing a second modification.

My anti-skidding device consists of a locking dog 1, a rigid member 2 to which the locking dog is pivotally connected, side chains 3 and 4 connected to the ends of the rigid member 2, and a ground gripping member 5 connected to the other or outer ends of the chains 3 and 4.

The details of the locking dog 1 are as follows: A piece of stiff strap iron is cut to the desired size and shape and bent to form the bearing 6, the return bend 7 extending from the bearing 6, the supporting plate 8 extending from the opposite end of the return bend 7 from the bearing 6, and the handle portion 9 extending from the opposite end of the plate 8 from the return bend 7.

The details of the rigid member 2 are as follows: A piece of strong rod is cut to the desired length and the piece is bent to form the straight central portion 10 mounted in the bearing 6, the arms 11 and 12 extending from the ends of the central portion 10, the eye 13 formed on the outer end of the arm 11 and hooked through the end link of the chain 3 and closed, and the hook 14 formed on the outer end of the arm 12 and removably hooked through the end link of the chain 4. The chains 3 and 4 are substantially alike and each consists of about four links of an ordinary twist link chain.

The details of the ground gripping member 5 are as follows: A piece of hard rod is cut to the desired length and bent to form the eye 15 hooked through the outer link of the chain 3 and closed, the return bend 16 extending from the eye 15, the return bend 17 extending from the return bend 16, the return bends 18, 20, 22 and 24 in line with the return bend 16, and the return bends 19, 21 and 23 in line with the return bend 17, the connections between the bends being parallel, and the bends extending in planes crosswise of the tread of the tire, and the eye 26 extending from the bend 24 and hooked through the outer link of the chain 4 and closed. The number of bends in the member may be increased or decreased to suit the size of the tire and the size of the material used.

In Fig. 5 I have shown the member 5 constructed of material which is shaped as shown in Fig. 5 in cross section and has a sharp edge 27 to engage the ground. The bar is formed of this shape from end to end, and of course, the edge 27 extends from end to end so as to make a zigzag cutting edge which will cut into the ground and hold the vehicle from skidding forwardly or backwardly or sidewise.

In Fig. 7 I have shown the member 5 made of circular material 28, and in Fig. 8 I have shown the member 5 made of square material 29 and various other forms may be used.

The anti-skidding devices are made to fit a wheel 30 upon which they are to be applied, and when an anti-skidding device is to be applied the chain 4 is disconnected from the hook 14, the handle 9 is engaged to swing the locking dog 1 as shown in dotted lines in Fig. 2, and the bearing 6 is placed against the inner face of the felly 31 and the members passed around the tire 32 and the inner link of the chain 4 applied to the hook 14, as shown in Fig. 3; then the handle 9 is manipulated and pressed toward the felly thus causing the bearing 6 carrying the portion 10 of the member 2 over the return bend 7, thereby tightening and holding the member 5 against the tread of the tire.

When the anti-skidding devices are no longer needed upon the wheel the handles 9 are manipulated and swung upwardly to loosen the strain on the tread, and then the chain 4 is unhooked from the hooks 14.

Various changes may be made without departing from the spirit of my invention as claimed.

I claim:

1. An anti-skidding device comprising a locking dog, a rigid member to which the locking dog is pivotally connected, side chains connected to the ends of the rigid member, and a ground gripping member connected to the outer ends of the side chains.

2. An anti-skidding device comprising a locking dog formed of strap iron bent to make a bearing, a return bend extending from the bearing, a supporting plate extending from the opposite end of the return bend from the bearing, a handle extending from the opposite end of the supporting plate from the return bend, a rigid member having a central portion extending through the bearing, side chains connected to the ends of the rigid member, and a ground gripping member connected to the outer ends of the side chains.

In testimony whereof I have signed my name to this specification.

HERMAN C. KREIPKE.